US007672885B2

(12) United States Patent
Stubbs et al.

(10) Patent No.: US 7,672,885 B2
(45) Date of Patent: Mar. 2, 2010

(54) CONSOLIDATED PURCHASING SYSTEM FOR SEARCH TERM AUCTIONS

(75) Inventors: Charles Stubbs, Atlanta, GA (US); Laurie Scholl, Atlanta, GA (US); Derek Talbot, Suwanee, GA (US); Matthew Mulqueen, Atlanta, GA (US); Bill Lott, Atlanta, GA (US); W. Braxton Caswell, Jr., Alpharetta, GA (US); Neil Salvage, Atlanta, GA (US)

(73) Assignee: AT&T Intellectual Property I, L. P., Reno, NV (US)

( * ) Notice: Subject to any disclaimer, the term of this patent is extended or adjusted under 35 U.S.C. 154(b) by 1438 days.

(21) Appl. No.: 10/930,180

(22) Filed: Aug. 31, 2004

(65) Prior Publication Data

US 2005/0209953 A1 Sep. 22, 2005

Related U.S. Application Data

(60) Provisional application No. 60/553,811, filed on Mar. 17, 2004.

(51) Int. Cl.
*G06Q 40/00* (2006.01)
(52) U.S. Cl. .................. 705/35; 705/36; 705/36 T; 705/39
(58) Field of Classification Search ............... None
See application file for complete search history.

(56) References Cited

U.S. PATENT DOCUMENTS 6,057,834 A 5/2000 Pickover
6,167,386 A * 12/2000 Brown ................... 705/37
7,054,857 B2 * 5/2006 Cunningham et al. ........ 707/3
7,092,901 B2 * 8/2006 Davis et al. ............. 705/26
2003/0220918 A1 * 11/2003 Roy et al. .................. 707/3

OTHER PUBLICATIONS

Website print-out of: http://www.interland.com/website/myezclicks, printed Dec. 22, 2004, entitled "The MyEzClicks Advantage"; © 2004 Interland.
Stubbs; U.S. App. No. 10/930,888, filed Aug. 31, 2004.
Stubbs; U.S. Appl. No. 10/931,138, filed Aug. 31, 2004.
Stubbs; Non- Final Rejection mailed Oct. 16, 2007, for U.S. Appl. No. 10/931,138, filed Aug. 31, 2004.

* cited by examiner

*Primary Examiner*—Kambiz Abdi
*Assistant Examiner*—Benjamin S Fields
(74) *Attorney, Agent, or Firm*—Scott P. Zimmerman PLLC

(57) ABSTRACT

A consolidated purchasing system for search term auctions is provided. The system typically includes receiving logic, analyzing logic, and purchasing logic. The receiving logic receives orders from customers. The analyzing logic receives and consolidates the plurality of orders, analyzes a dynamic auction for search terms on a search engine, and determines search terms upon which to bid and an amount to bid for the search terms. The determination of the amount to bid on the search terms is in response to a budget and an expected return on the search terms. The purchasing logic receives instructions from the bidding logic and bids on the search terms in the dynamic auction, wherein the cost of a position on a search result list for the search engine changes in response to input from auction participants. Other systems and methods are also provided.

16 Claims, 6 Drawing Sheets

US 7,672,885 B2

CONSOLIDATED PURCHASING SYSTEM FOR SEARCH TERM AUCTIONS

CROSS-REFERENCE TO RELATED APPLICATIONS

This application claims priority to and incorporates by reference copending U.S. provisional application having Ser. No. 60/553,811, filed Mar. 17, 2004.

DESCRIPTION OF THE RELATED ART

The world wide web has grown to encompass an expansive array of personal web pages, business web pages, portals, and internet search engines. Because of the web's expansive nature, internet search engines have grown increasingly important to the everyday user of the web. The search engine makes it possible to find those pages of which a user may have been previously unaware, whether it is for personal or business interest.

Of particular interest to businesses are the searches performed by consumers. It is estimated that about 41% of online buyers say that they find the web sites they use to research a purchase by using search engines. Moreover, 8-10% of general search queries include a local modifier, such as "Atlanta," or "Charlotte," or "Miami." Furthermore, it is estimated that 4% of web searches are the functional equivalent of a local yellow pages search. These facts make it imperative for businesses (especially small businesses) to be included in search engines' databases of web pages.

However, most search engines have turned their search engine database into a profit center. Two models exist currently and are commonly referred to as: Paid Inclusion and Pay for Performance. Paid inclusion engines charge a website a one-time or annual fee to expedite inclusion in the engine's index. Increasingly in 2004, it appears Paid Inclusion engines will also charge that website a variable fee (cost per click) on top of the upfront fees. Pay for Performance engines often sell specific search terms in a dynamic auction that determine the price of a particular location in the search results. These paid advertisements are usually charged per click-through, i.e., pay for performance (P4P).

Third party vendors have begun offering services to larger companies to procure search terms, advertising banners, search inclusion, etc. at a price per click rate. These plans sometimes have a spending cap, after which the vendor receives no more money and the advertiser receives no more clicks. Thus, the typical models for search engine marketing are paid inclusion by buying entry into a search engine's database, or pay-per-click by buying the right to appear when particular search terms are used. Therefore, there is a need for systems and methods that address these and/or other perceived shortcomings.

SUMMARY OF THE DISCLOSURE

One embodiment, among others, of the present disclosure provides for a consolidated purchasing system for search term auctions. A representative system typically includes receiving logic, analyzing logic, and purchasing logic. The receiving logic receives orders from customers. The analyzing logic receives and consolidates the plurality of orders, analyzes a dynamic auction for search terms on a search engine, and determines search terms upon which to bid and an amount to bid for the search terms. The determination of the amount to bid on the search terms is in response to a budget and an expected return on the search terms. The purchasing logic receives instructions from the bidding logic and bids on the search terms in the dynamic auction, wherein the cost of a position on a search result list for the search engine changes in response to input from auction participants.

A representative method, among others, of consolidated purchasing of search term auctions includes the following steps: receiving a plurality of orders from a plurality of customers; consolidating the plurality of orders; determining a plurality of relevant search terms upon which to bid responsive to the orders; analyzing a dynamic auction for the plurality of relevant search terms on a search engine; determining an amount to bid for the plurality of search terms responsive to a budget for the plurality of orders, and an expected return on the plurality of relevant search terms; and, bidding on the plurality of relevant search terms in the dynamic auction, wherein the cost of a position on a search result list for the search engine changes responsive to the input from a plurality of auction participants.

Other systems, methods, and/or computer programs products according to embodiments will be or become apparent to one with skill in the art upon review of the following drawings and detailed description. It is intended that all such additional system, methods, and/or computer program products be included within this description and be within the scope of the present disclosure.

BRIEF DESCRIPTION OF THE FIGURES

The disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Embodiments of the disclosure now will be described more fully with reference to the accompanying drawings. The disclosure may, however, be embodied in many different forms and should not be construed as limited to the embodiments set forth herein; rather, these embodiments are intended to convey the scope of the disclosure to those skilled in the art. Furthermore, all "examples" given herein are intended to be non-limiting.

Figure 1:
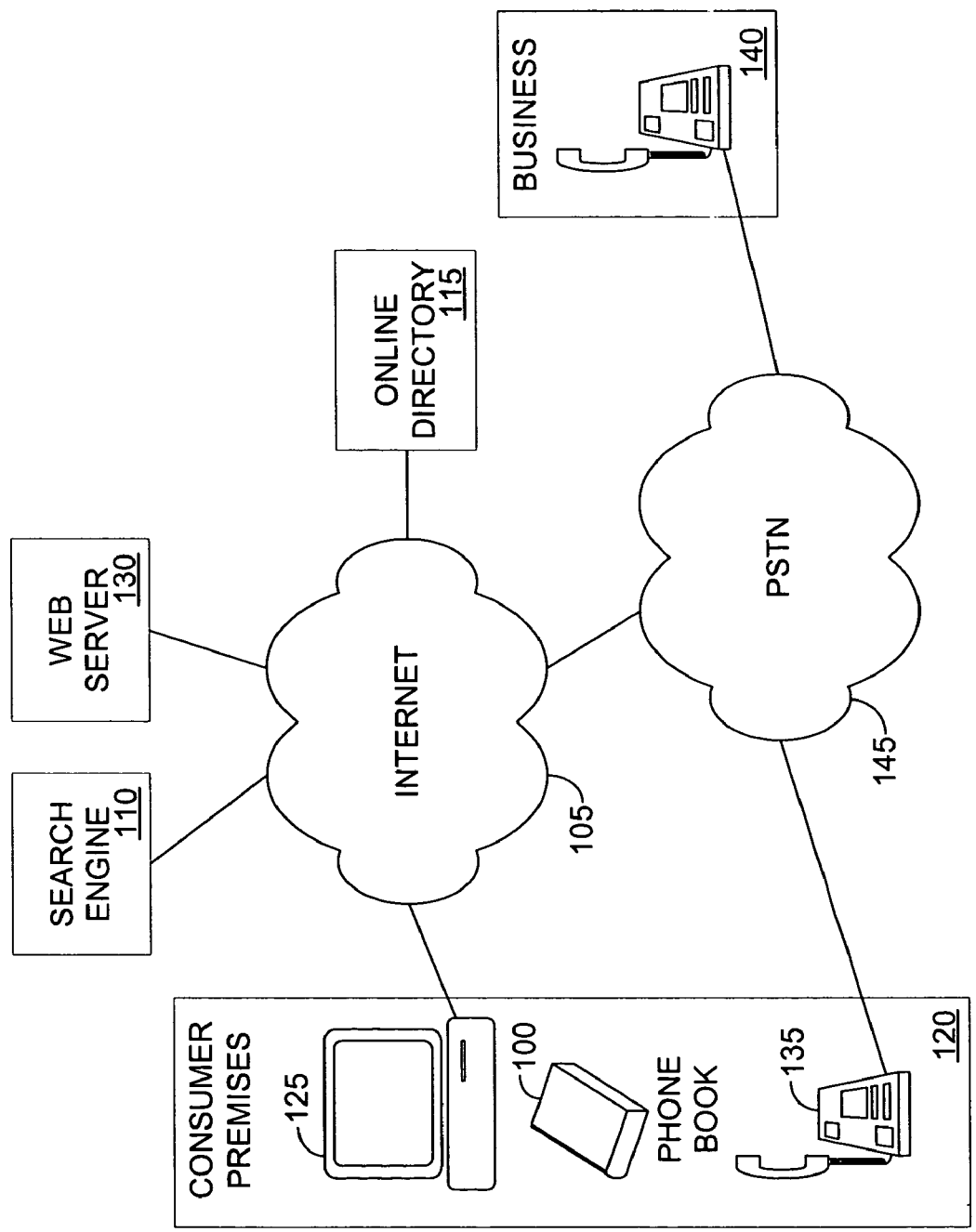
FIG. 1 is a block diagram of advertising channels for pull media outlets of one embodiment, among others, of the present disclosure.

Referring now to FIG. 1, shown are advertising channels that are based upon pull-type media mechanics. Pull-type media are those media that require action on the part of the consumer to access. These actions in various embodiments of the present disclosure, among others, include searching a print directory 100 for a type of business, searching the internet 105 via a search engine 110 for a type of business, or searching an online directory 115 for a type of business. However, one skilled in the art should recognize that there exist other actions, such as requesting information, signing up for a mailing list, downloading files, etc. which are included among the various embodiments of the present disclosure.

As shown in FIG. 1, a consumer premise 120 typically includes a computer 125, yellow pages 100, and a telephone 135, or any combination thereof. A consumer would typically use the computer 125 to access the internet 105. As one skilled in the area should understand, there are typically intermediaries between the computer 125 and the internet 105 which have been omitted for the sake of clarity. A few such intermediaries can include, among others, the public-switched telephone network (PSTN), a gateway, a server, and other internet service provider (ISP) systems.

Upon connecting to the internet 105, the user can typically request information from the search engine 110 or the online directory 115. It should be understood by those skilled in the art that each of the search engine 110 and online directory 115 typically comprise a web server and at least one database. The database (or collection of databases) is used to produce web pages (static or dynamically created files or pages that can be rendered by a receiving computer's web browser), as well as information that can be queried by the consumer to find a particular item of interest (e.g., search results in the case of the search engine 110, and directory results in the case of the online directory). The above description of the components and mechanics of the search engine 110 and online directory 115 are quite simplified, however, one skilled in the art should readily understand these items and understand that a full description is not necessary for enablement of the various embodiments of the present disclosure.

The search engine 110 typically provides a search page representation that allows the consumer to enter information about his or her search, including search terms. Upon sending search terms to the search engine 110, the search engine 110 typically returns a plurality of search results. As described above, the search engine is typically a server coupled to at least one database. The server typically includes components for communicating with the consumer computer 125, and components for formatting the information being sent to the computer 125. The database typically includes the result of a spider (or crawler) program, which, as known in the art, searches the web and returns new web page metatags and content for the database to store and track. The database can also be built manually and/or by paid advertisers as is known in the art. The database can provide the web pages (files) to the server for communication to the computer 125.

The plurality of search results sent to the user typically includes, among others, link representations which enable the user to request a web page from a web server 130 upon selecting the link representation. Among the link representations, there are typically included paid advertising link representations that are keyed to the search terms used. Additionally, some search engines auction search terms in a dynamic auction that enables website owners to purchase a position in the list of search results. The link representations, moreover, typically contain embedded information allowing the computer 125 to communicate to the search engine 110 that the link was selected from a web page provided by the search engine 110. This embedded information allows the search engine 110 to collect information which, among other things, helps the search engine 110 bill its customers (typically advertisers) as described below.

Because consumers typically stop searching after finding an acceptable link, it is typically advantageous for a website owner to bid his or her way to the top of the list of link representations. However, because of the dynamic nature of the auction process as it relates to small businesses, the website owner typically does not have the time to learn about the auction process or monitor the auction process, in addition to running his or her own small business. Moreover, it typically does not make sense for a small business to hire someone to monitor the auction process for the small business owner. Furthermore, small businesses typically do not have access to the same information to which larger businesses have access. For instance, among other examples, a larger business may have some information that leads to the business having the ability to cull an aggregation of lesser-known search terms that result in the same level of traffic for less money in the auction process.

With regards to using the online directory 115, the consumer typically receives a web page allowing the user to enter a category and a geographic location associated with the type of business the consumer is trying to find. Upon entry of this information the consumer sends this information to the online directory 115. The online directory, which one skilled in the art will recognize typically takes the form of a server coupled to at least one database, then returns the businesses that match both the category and location supplied by the user. The online directory also typically includes paid links to advertisers. These paid links are advantageous for advertisers to buy, because they appear first in, or more prominently associated with, the results listing, in some embodiments. As known to those skilled in the art, the online directory typically supplies a telephone number for the advertiser, a website for the advertiser, and a map, among others, or any combination thereof. If the consumer wishes to obtain more information about the advertiser, he or she can request the advertiser's web page from web server 130 or call the advertiser at his or her physical premises 140 using the telephone 135.

The consumer can also use the yellow pages 100 to find and/or telephone a business. As known to those skilled in the art, businesses can also pay for advertising space in the yellow pages 130. The cost of the advertisement is typically linked to the size of the ad and location of the ad. Furthermore, a service provider, e.g., BellSouth of Atlanta, Ga., offers a guaranty on results from selected advertisements in selected markets. Specifically, the provider monitors telephone calls to the advertiser, e.g., using a designated number, and guarantees a certain level of callers on a semi-annual basis, for example. The guaranteed service is typically priced at full rate, but a rebate may be available if the promised level of customer delivery (call counts) is not achieved. The provider is then able to forecast the market and determine what size and placement of the ad is necessary to deliver the promised level of customer delivery. In accordance with one embodiment, among others, of the present disclosure, it is herein recognized that a somewhat similar type of guaranteed service can be applied, along with other aspects, to the online environment, such as with results from one or more search engines 110.

Figure 2:
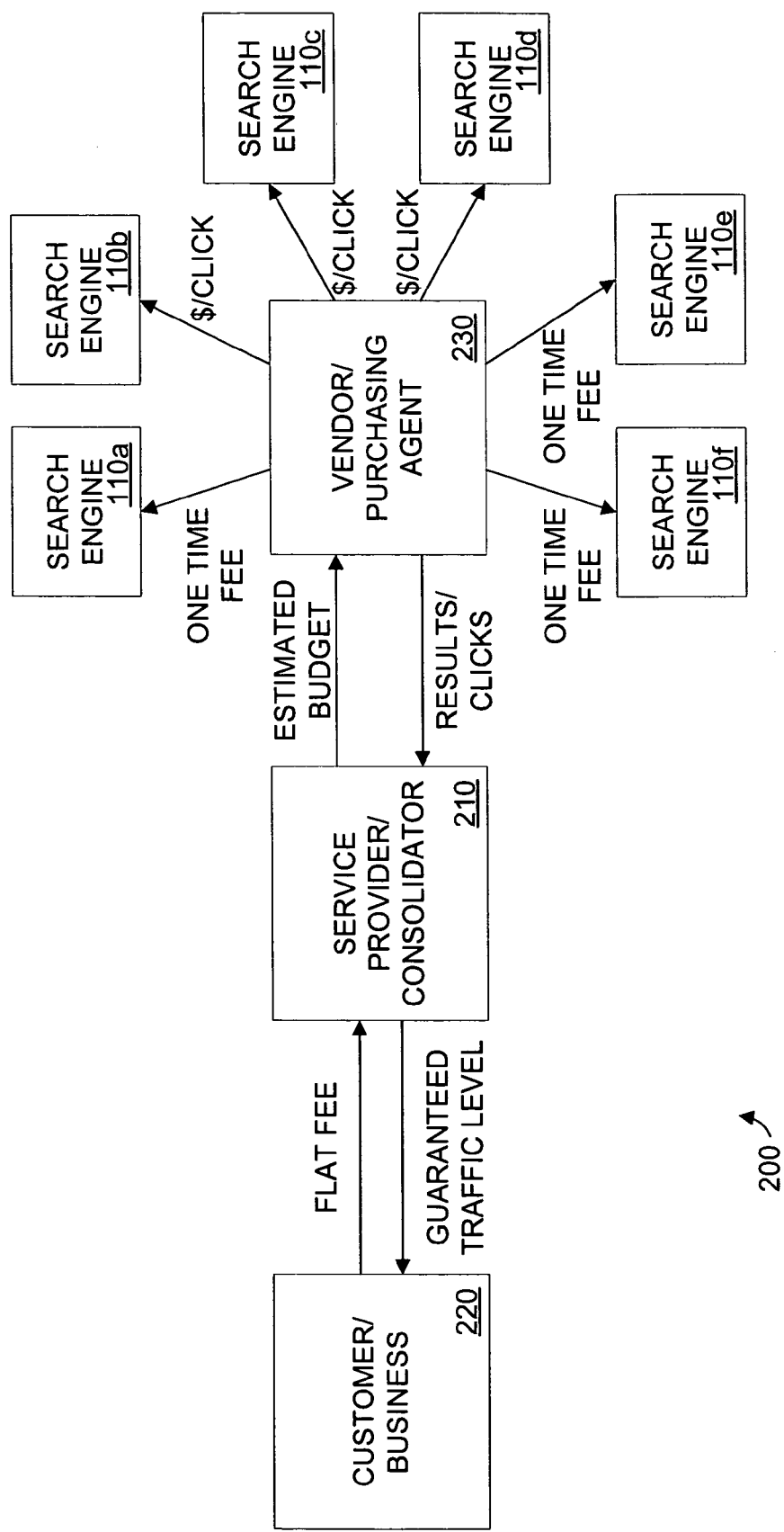
FIG. 2 is a block diagram of an architecture of an embodiment, among others, of a flat-fee pricing structure and advertising procurement system.

Referring now to FIG. 2, shown is an embodiment, among others, of an architecture 200 of the present system. In this architecture 200, a service provider/consolidator 210 typically provides a service to a customer 220. In some embodiments, among others, of the present disclosure, the service provider/consolidator 210 designs and hosts websites for businesses. In other embodiments, among others, the service provider/consolidator 210 provides telephone service to the customer, as well as advertising services to the customer via a "yellow pages" type directory. As should be recognized by one skilled in the art, as used in this context, a "yellow pages" type directory is meant to include a print directory as well as an online directory. Moreover, the service provider/consolidator 210 in some embodiments, among others, provides graphic design services to the user for the purposes of creating print ads for the "yellow pages" type directory.

The service provider/consolidator 210 in one embodiment, among others, of the present disclosure, offers at least one service plan to procure a specific metric such as number of visits over a specified period of time to a customer's 220 website through at least one search engine. In a broader sense, one skilled in the art should understand that any metric could be used to measure the traffic brought in by an advertisement. In particular, some examples among others, of other metrics include phone calls, purchases, e-mail messages, instant messages, downloads, mailing list inclusions, sign-ups, etc. In some embodiments, the service (pricing) plans are flat-fee plans, and in some embodiments, other types of plans are available to customers, including, among others, tiered and adjustable plans. Furthermore, some embodiments include providing customers choices to receive additional advertising or adjust service fees based upon feedback. In addition, in some embodiments, among others, only geographically related traffic is directed to a customer by design, and in other embodiments, geographical association with a customer is not as important, including some embodiments with little or no geographical limitations.

In some embodiments, among others, of the present disclosure, a guarantee is provided to the customer 220, such that the customer 220 receives the requisite number of visits, or receives money-back or free additional advertising if the requisite number of visits under the service plan is not procured in a particular time period. In some embodiments, a single search engine is employed for such guaranteed results, while in other embodiments, multiple search engines are utilized to achieve the guaranteed results. One skilled in the art should recognize the value of this service, particularly for the small business owner. Search engines 110a-f typically charge per visit, which represents a variable cost for which it is difficult to plan. Many businesses would rather have a definite fixed cost, which is supplied by the flat-fee service described herein.

Moreover, in some embodiments, among others, of the present system, the service provider/consolidator 210 purchases service from a vendor/purchasing agent 230. The service provider/consolidator 210 in this embodiment, among others, would provide the vendor/purchasing agent 230 with a budget and a target for a number of visits based on the advertising procured by the vendor/purchasing agent 230. The vendor/purchasing agent 230 is then typically allowed to spend the budget with allowances for slight increases as the market demands. The vendor/purchasing agent 230 is further instructed to aim for a target number of visitors to the website as a result of the advertising measures taken. In some embodiments, among others, of the present disclosure, the target number of visitors is approximately 120% of the guaranteed number of visitors over a period of time, per the contracted service plan between the customer 220 and the service provider/consolidator 210. The 20% premium over the guaranteed level is used to assure that the guaranteed number of visitors is met, and further that a shortfall in one time feedback period can be recovered by an excess in another feedback period.

According to one example, among others, in order to reach the target number of visitors to the website, the vendor/purchasing agent 230 is provided with a set of business rules regarding actions to take to meet the various levels of visitors per the service plan purchased by the customer 220. In accordance with this example, at a first service level the customer 220 is provided one universal resource locator (URL) inclusion on three basic search engines, one site description for submission to the search engines, and limited keywords for the search engines that accept them. At a second service level, the customer 220 is provided one URL inclusion on three basic search engines, one site description, and keywords are distributed to enough additional search engines to fulfill a traffic target of 36 clicks, along with subsequent optimization to fulfill the traffic target. At a third service level, the customer is provided the same things as at the second level, however they are distributed to enough additional search engines to fulfill a traffic target of 108 clicks. At a fourth service level, the customer is provided up to three URL inclusions on four search engines, up to three site descriptions, and keywords are distributed to enough additional search engines to fulfill a traffic target of 204 clicks. At a fifth service level, the customer is provided with the same URL inclusions and site descriptions as the fourth service level, and keywords are distributed to enough additional search engines to fulfill a traffic target of 480 clicks. At a sixth service level, the customer is provided with the same URL inclusions and site descriptions as the fourth and fifth service levels, and the keywords are distributed to enough additional search engines to fulfill a traffic target of 900 clicks.

The vendor/purchasing agent is further instructed through the business rules to perform steps to increase traffic upon receiving a feedback metric indicating that current performance is not in line to meet the target metric. Actions that the vendor/purchasing agent 230 can perform to increase traffic include, among others, purchasing additional search terms on any of the search engines 110a-f, bidding up a particular search term on any of the search engines 110a-f, distributing the website to more search engines 110a-f, purchasing paid advertising space on the search engines 110a-f, etc. Each of these "levers" that can be "pulled," i.e., threshold contingent actions that can be taken, among others, allow the vendor to adjust the traffic flow to meet the level of traffic expected by the customer 220 and the service provider/consolidator 210. With regard to the first service plan mentioned above, the vendor/purchasing agent 230 seeks instruction from the service provider/consolidator 210 if the customer's account is pacing at less than 10 clicks per month. With regard to the second through sixth service plans mentioned above, the vendor/purchasing agent 230 is authorized to optimize the customer's account, if the customer's account is pacing 20% or more behind the target after 30 days. Optimization, in one embodiment, among others, of the present disclosure, enables the vendor/purchasing agent 230 to pay for inclusion of up to 3 URLs. The vendor/purchasing agent 230 may further use any pay-per-click media as necessary subject to monthly budget range. In this regard, the vendor/purchasing agent 230 should target the lowest cost-per-click from the pay-per-click media, and use preferred pay-per-click media when possible. The vendor/purchasing agent 230 typically should also avoid bidding customers 220 of the service provider/consolidator 210 against each other.

One skilled in the art should recognize that there exist alternative embodiments, among others, of the present disclosure, wherein the target metric may also be reached by enabling the vendor/purchasing agent 230 to purchase advertising space on other websites (such as, among others, internet portals). However, this traffic is a result of what is referred to herein as push-type media. The resulting traffic of push-type media is typically not as geographically or consumer oriented as the traffic seen as a result of the pull-type advertising efforts. Therefore, the customers 220 typically do not see the same return from the push-type media investments.

Those skilled in the art should also recognize that there is a feedback metric received from each of the search engines 110a-f. Typically, the business rules instruct the vendor/purchasing agent. If the feedback metric for the traffic resulting from original action taken by the vendor/purchasing agent 230 are tracking over the 120% target, then actions can be taken by the vendor/purchasing agent 230 to slow the projected rate. Thus, the vendor/purchasing agent 230 can use adjustment levers such as, for example, among others, capping spend levels to limit results, pausing search engine inclusion results, and reducing number of, or bid price for, search terms to reduce the projected metric for the customer. With regard to the first service plan mentioned above, since there is no target, there is no need to adjust the available levers. With regard to the second through sixth service plans mentioned above, the vendor/purchasing agent 230 is authorized to decrease or eliminate all pay-per-click media if the customer's account is pacing more than 20% ahead of the target. If the customer's account is pacing more than 5% ahead of target, the vendor/purchasing agent 230 is authorized to eliminate some pay-per-click media.

One skilled in the art should further understand that in the various embodiments, among others, of the present disclosure, the system could be modified to include a service plan whereby the customer 220 could purchase a number of consumer opportunities for a flat-fee, for example. In this embodiment, among others, the consumer opportunities would come by way of any of a plurality of media. These media include, among others, a telephone call, a website visit, an instant message, an e-mail message, a purchase, a download, a mailing list, a visitor list, or any other opportunity upon which a feedback and metric can be obtained. Thus, the service provider/consolidator 210 could sell the service of providing opportunities to the customer 220, as opposed to merely selling advertising space, which may not have a specific expectation of return through a particular media source.

For example, in some other embodiments, among others, a customer 220 could purchase a plan for 100 opportunities per month. The service provider/consolidator 210 would typically have business rules that instruct which media to use to get the customer 220 100 opportunities in a particular month. These could include, among others, advertising in pull-type media such as the yellow pages 100, search engines 110a-f, and the online directory 115. Moreover, these media include push-type advertising such as banner adds on internet portals, television and radio spots, billboards, promotions, word of mouth, or any other push-type media. Furthermore, in various embodiment, among others, the media for reaching the 100 opportunities per month include any combinations of push-type and pull-type media.

Statistical analysis would enable the service provider/consolidator 210 to forecast whether the obligation for the number of opportunities would be met. As described previously, various adjustment levers can be used to increase or decrease a forecasted number of opportunities based upon a target. In the various types of media used to generate the opportunities different types of adjustment levers will be used to adjust the forecast, as should be recognized by those skilled in the art.

Figure 3:
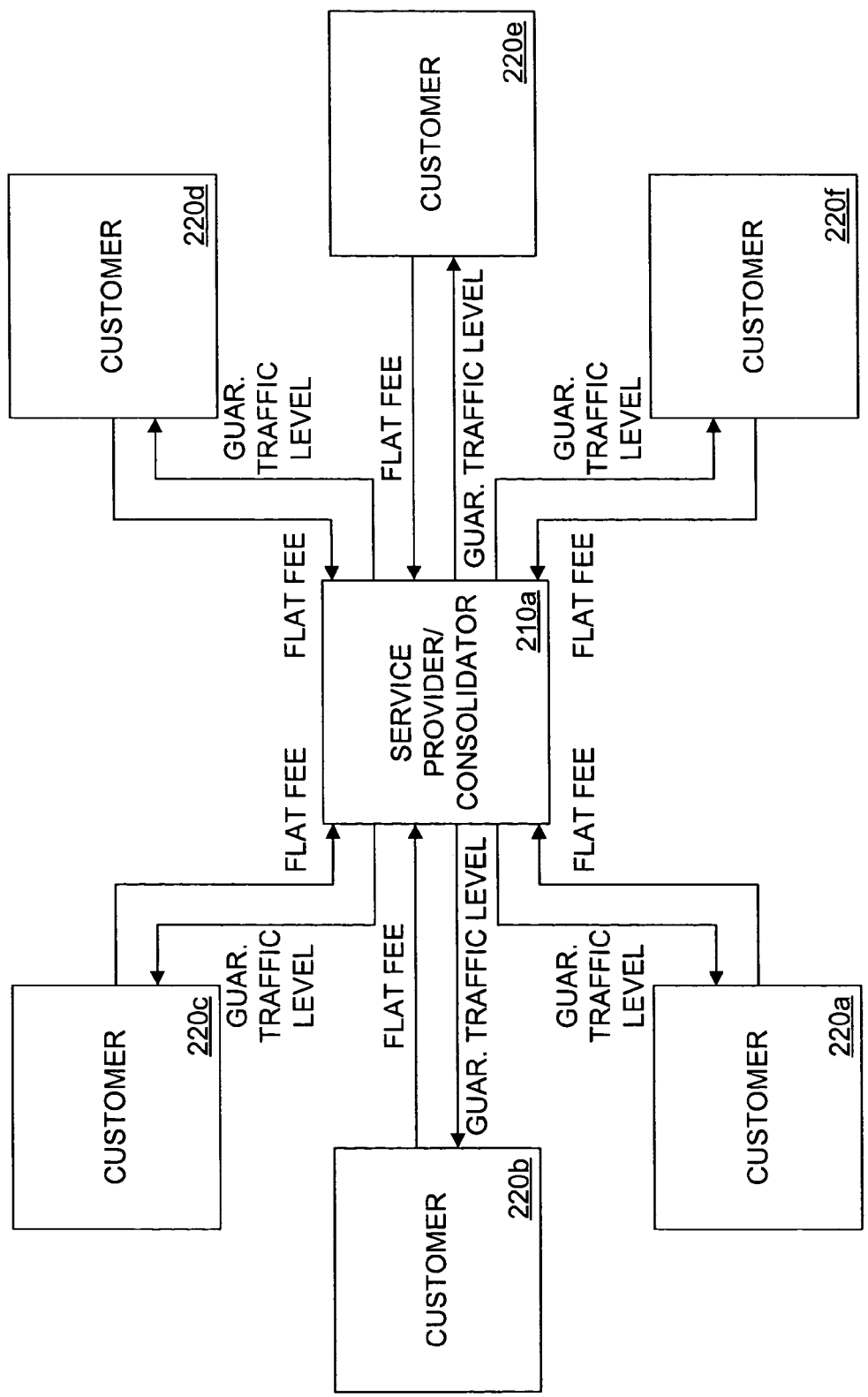
FIG. 3 is a block diagram illustrating the consolidation of the customers and distributed vendors discussed with reference to the architecture of FIG. 2.

Referring now to FIG. 3, shown is a block diagram illustrating the consolidation of the customers and distributed vendors discussed with reference to the architecture of FIG. 2. One skilled in the art should recognize with respect to FIG. 2, that the customer 220 shown is typically not the only customer served by the service provider (although the customer 220 in some embodiments, among others, of the present disclosure may be the sole customer). In this embodiment, among others, the architecture is collapsed to show the interaction between the service provider/consolidator 210a and multiple customers 220a-e. Each of the customers typically provides the service provider/consolidator 210a with a flat fee for his or her service plan. It should be recognized that there are typically numerous types of service plans, and that each customer has the option to choose his or her own service plan, which would entail, in one example, a specific flat-fee, or negotiation regarding the flat-fee.

One skilled in the art should recognize the value of consolidating the service to provide internet traffic to customers' 220a-e respective websites. Consolidation can lead to many positives, including, among others, better prices on search terms, better knowledge about the market, sharing of resources. Moreover, the knowledge gained by consolidation typically leads to a better ability to forecast the expected results of various actions that can be taken by the consolidator. Furthermore, the knowledge can be used to discover new search terms which could lead to an aggregation of search terms that produces the same expected result as a more expensive (more popular) single search term. This service is especially useful to the small business, which has a difficult time learning and keeping up with the dynamic marketplace of search term auctions. These small businesses usually cannot afford to take on an employee to try to perform this function.

A small business could quickly become overwhelmed by the mere process of discovering and registering to get an account with each of the search engines, just to join the process of the dynamic auction. Moreover, each search engine 110a-f typically has its own terms and conditions, costs, and reporting methods. The service provider/consolidator 210a reduces the hassle of previous methods by providing an interface between the customers 220a-e and the search engines 110a-f, reporting the results in a single format, and providing a single bill, e.g., monthly, for the customer 220a-e to manage. Further, the service provider/consolidator 210a is able to provide an accurate site description for the each customer's 220a-e website, without relying upon the spiders to accurately and completely characterize the website.

Figure 4:
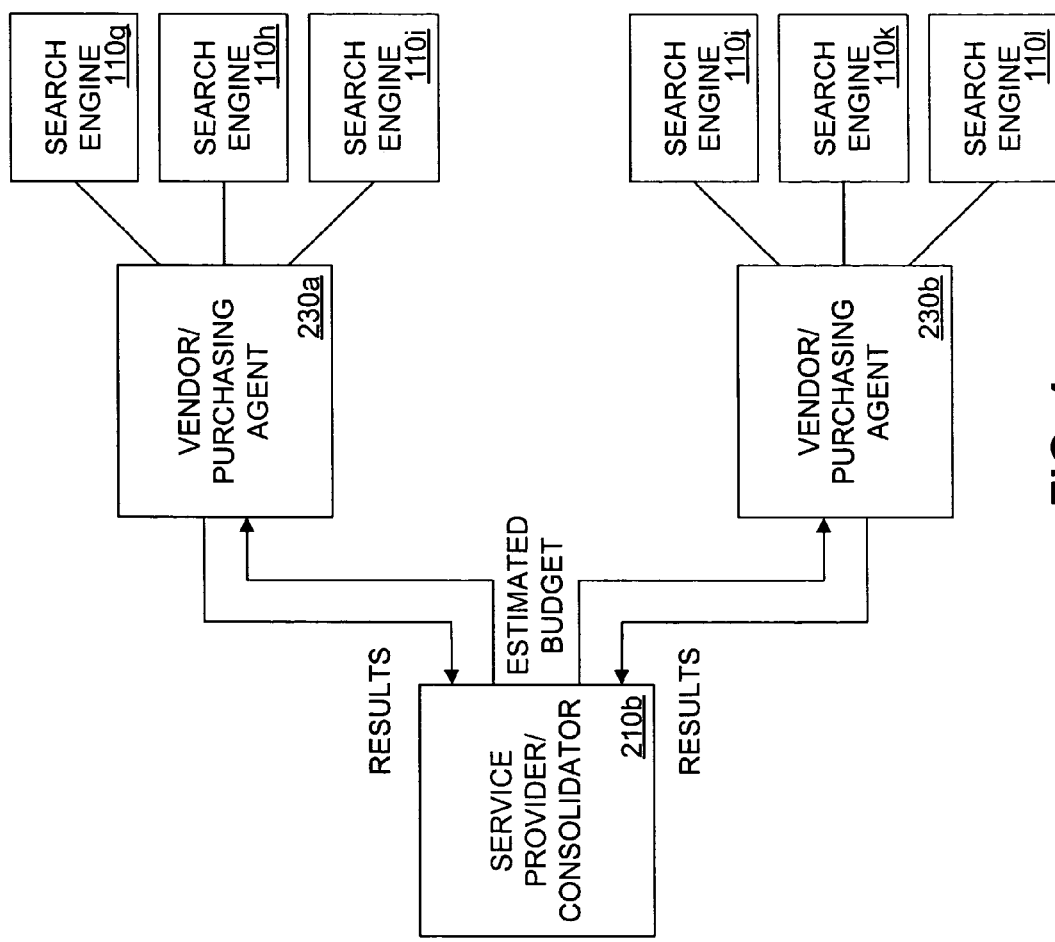
FIG. 4 is a block diagram illustrating the diversification of the vendors and discussed with reference to the architecture of FIG. 2.

Referring now to FIG. 4, shown is a block diagram illustrating the diversification of the vendors as discussed with reference to the architecture of FIG. 2. In particular, the service provider/consolidator 210b may be able to obtain better pricing through working with multiple vendors/purchasing agents 230a-b. Those skilled in the art should recognize some of the advantages of diversification of vendors/purchasing agents 230a-b. In particular, business relationships sometimes erode, and it can be good to have multiple arrangements in place in case such a situation occurs. Better prices can be maintained through competition as opposed to an exclusive dealings arrangement between the service provider/consolidator 210b and the vendor/purchasing agent 230a-b. Furthermore, one vendor/purchasing agent 230a-b may be better at certain aspects of his or her business than others, and locating complementary vendors/purchasing agents 230a-b can be advantageous for the service provider/consolidator 210b and the customer(s) 220.

Furthermore, one skilled in the art should recognize that this architecture is similar to the architecture that would be used for providing a flat fee service for a number of consumer opportunities described above. Specifically, the vendors/purchasing agents 230a-b could be experts at buying certain types of media. For example, among others, the first vendor/purchasing agent 230a could be an expert in procuring push-type advertising media, while the second vendor/purchasing agent 230*b* could be an expert in procuring pull-type advertising media. One skilled in the art should recognize, however, that the service provider/consolidator 210*b* could hire numerous vendors/purchasing agents 230*a-b* based on geography, media specialty (e.g., internet, radio, television, print, etc.), price, quality, etc., and each of these are intended to be included within the scope of the present disclosure.

Figure 5:
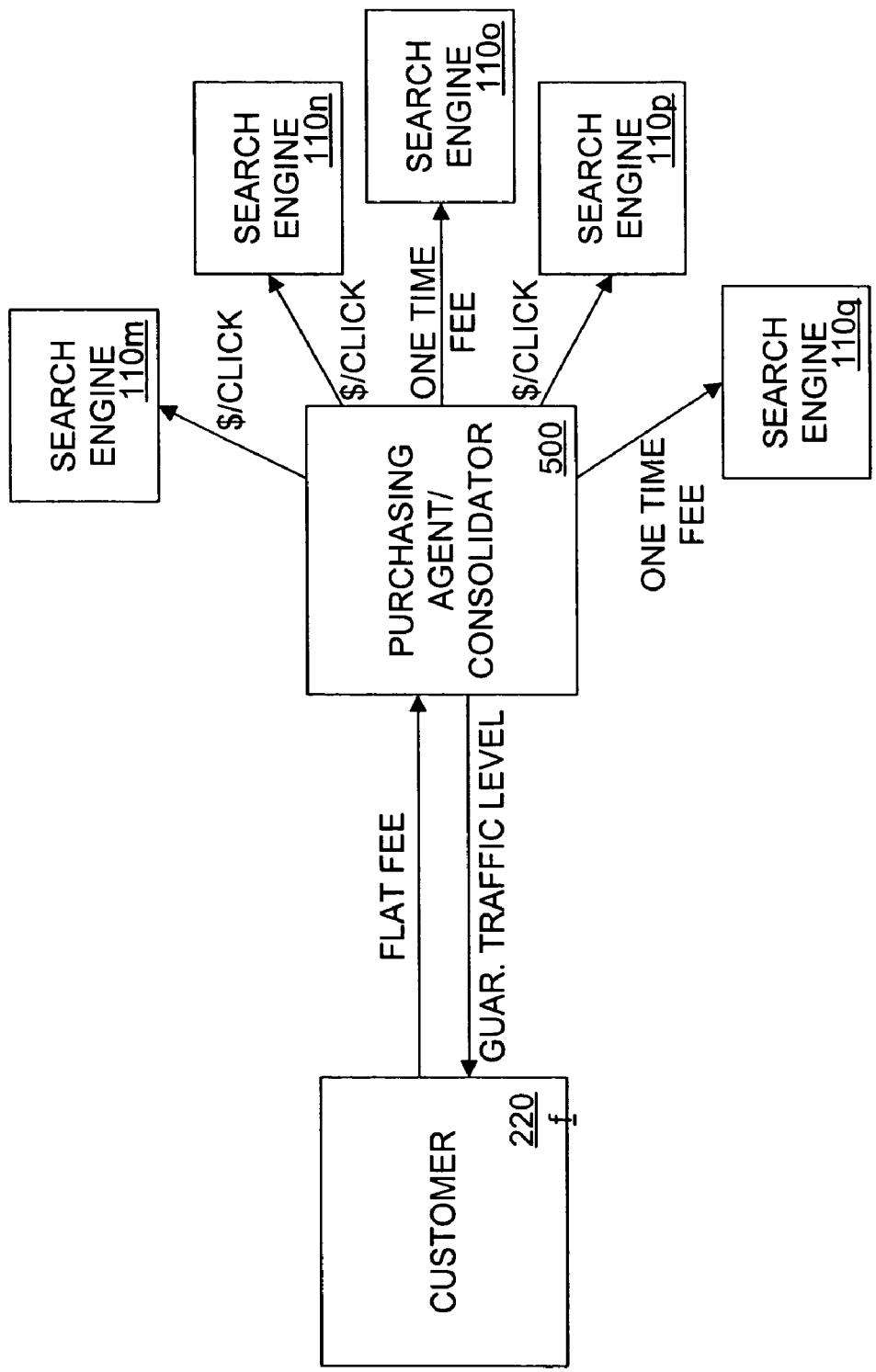
FIG. 5 is a block diagram illustrating an embodiment of the disclosure which collapses the vendor and the consolidator into a single entity under the architecture of FIG. 2.

Referring now to FIG. 5, shown is a block diagram illustrating an embodiment of the disclosure which collapses the vendor and the consolidator into a single entity under the architecture of FIG. 2. In this embodiment, among others, the vendor/agent 230 of FIG. 2 becomes the purchasing agent/consolidator 500, providing service directly to the customer 220*f*. It should be recognized that in some instances, the small business does not need or desire all of the varied services provided by the service provider, and that the vendor alone may be able to provide the services the customer desires. In this instance the purchasing agent/consolidator 500 would provide the consolidation benefits previously associated with the service provider/consolidator 210, along with the benefit of eliminating a middle-man to the transaction. However, one of the benefits of the service provider/consolidator 210 is the existing relationship that existed between the service provider 210 and the customer 220. As such, the consolidator/purchasing agent 500 typically has to establish these relationships without prior business, which can be difficult. Other embodiments include systems in which search engines provide similar functionality, with or without separate provider or purchasing agent existence. For example, in some embodiments, a search engine (i.e., a company or entity managing such an engine) maintains direct customer relationships and provides purchased plans that implement the types of triggered events described herein to guaranty various levels of search result visits to a customer website. In still other embodiments, search engines cooperate with each other to meet the agreed-upon guarantees to customers.

Figure 6:
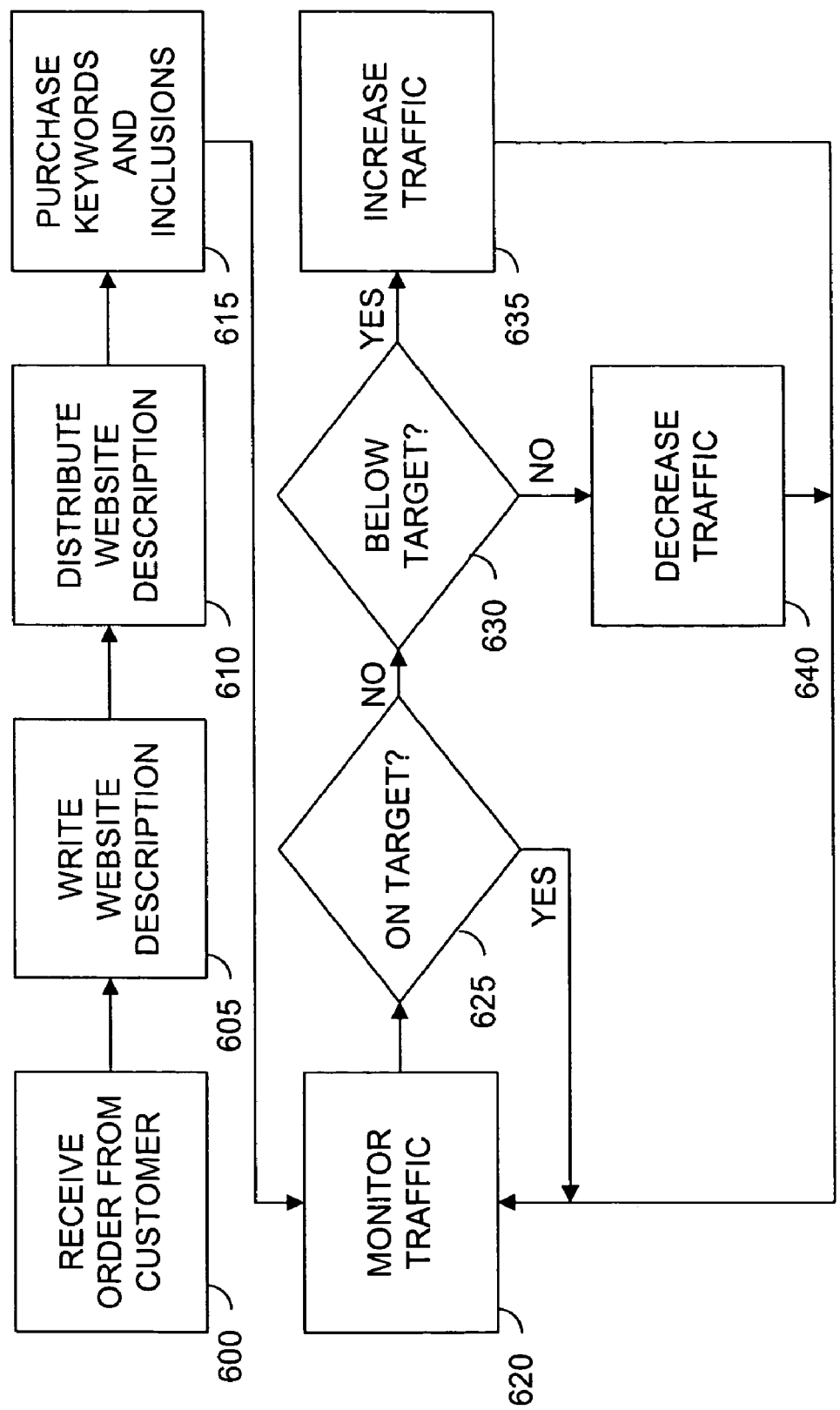
FIG. 6 is a flowchart illustrating the operation of an embodiment, among others, of the system of FIG. 2.

Referring now to FIG. 6, shown is a flowchart illustrating the operation of an embodiment, among others, of the present disclosure. In step 600, the service provider/consolidator 210 receives an order from a customer. One skilled in the art should recognize that in alternative embodiments, among others, the purchasing agent 230 receives the order from the customer. Moreover, the order can by via telephone, internet, mail, etc. In one embodiment, among others, of the present disclosure, the order is facilitated by an operator who provides information regarding the flat-fee pricing plan to the customer via the telephone. As mentioned above, the service provider 210 in some embodiments, among others, already has a business relationship with the customer, and may therefore provide the flat-fee pricing plan information along with billing information, direct mailings, new customer orders, etc. It should be recognized that there are a plethora of methods for soliciting and receiving orders, and that each of these methods of soliciting and receiving orders is intended to be included within the scope of the present disclosure.

Upon receiving an order from a customer for a flat-fee pricing plan, the service provider/consolidator 210 creates a website description for the customer responsive to the customer's input and the service provider/consolidator's experience with site descriptions, as shown in step 605. The site description is therefore tailored specifically to the customer's business, and tailored to provide the maximum amount of traffic which is relevant to the customer's business. One skilled in the art should recognize that the site description, in alternative embodiments, among others, of the present disclosure, may be created by the purchasing agent 230.

In step 610, the website description is distributed by the purchasing agent 230 to search engines. As described above, most search engines charge a one-time fee for expedited inclusion within the search engine. Some search engines further charge an additional amount based on the traffic generated by the search engine inclusion. The consolidated purchasing model described herein can reduce the cost for paid inclusion engines through large purchases. Moreover, the existing relationship between the purchasing agent 230 and the market allows the purchasing agent 230 to benefit from knowledge of the market through previous transactions. Furthermore, because of the tailored site description, the results obtained are typically more relevant for a small business.

In step 615, purchasing agent 230 purchases keywords and/or paid inclusions based on the flat-fee pricing plan purchased by the consumer. The number of search terms purchased and paid inclusions obtained is typically based upon previous experience with the market, and what level of traffic will result from the various search terms and paid inclusions purchased. Typically, this is knowledge obtained through interaction with the market, which may not be available to the customer in all instances. Moreover, it would be inefficient for a customer to learn the intricacies of the market, when a purchasing agent 230 can provide the market knowledge at a lower cost. In addition, associated local geographic keywords or search terms are used in some embodiments, among others, including some embodiments where such local geographic keywords or search terms are used in all combinations for some or all customers or plans.

In step 620, the purchasing agent 230 monitors the level of traffic achieved by the search engine(s) 110. As known to those skilled in the art, search engines 110 are typically equipped with reporting tools that allow both the search engine and the customer (purchasing agent) to observe the number of hits received via the keyword and/or the paid inclusion. Thus, the purchasing agent 230 can monitor the traffic associated with the keyword(s) and paid inclusion(s).

In step 625, the purchasing agent 230 can determine whether the traffic flow to the customer's website is on target. The target in some embodiments, among others, of the present disclosure is typically 20% above the traffic level stated in the flat-fee pricing plan. Moreover, the target is typically prorated to account for intermediate metrics which allow the purchasing agent to determine whether the traffic level stated in the flat-fee pricing plan will be achieved. Typically, the purchasing agent will not adjust the keyword(s) and/or paid inclusion(s) unless the actual traffic level is not targeting within 5% of the prorated target. If the prorated target is being achieved, the process continues to monitor the traffic, as shown in step 620.

If the prorated target is not being achieved (e.g. more than 5% above or below target), the purchasing agent determines whether the website traffic is targeting above or below the prorated target, as shown in step 630. If the website traffic is targeting below the prorated target, the purchasing agent 230 is authorized to increase the traffic for the website. Typically, this can be done by purchasing additional search terms and/or paid inclusions. The purchasing agent is also typically given a budget within which to operate. The budget typically operates to provide the purchasing agent with a mechanism to determine whether to meet the traffic level stated in the flat-fee pricing plan, or to abandon the account and provide additional service to the customer until the total traffic level stated in the flat-fee pricing plan is reached.

If the website traffic is targeting above the prorated target, the purchasing agent 230 is authorized to decrease the traffic for the website, as shown in step 640. Typically, website traffic is reduced by reducing the bid amount for search terms and/or reducing the number of paid inclusions for the website. As those skilled in the art should recognize, the target can be fragmented so as to provide more drastic actions in response to more drastic differences between the feedback metrics and the prorated target.

Upon adjusting the levers to result in more traffic (635) or less traffic (640), the purchasing agent can return to step 620 and continue monitoring the traffic level. Furthermore, additional adjustments can be made in response to further deviation from the prorated traffic target.

Process and function descriptions and blocks in flow charts can be understood as representing, in some embodiments, modules, segments, or portions of code which include one or more executable instructions for implementing specific logical functions or steps in the process, and alternate implementations are included within the scope of embodiments of the present disclosure in which functions may be executed out of order from that shown or discussed, including substantially concurrently or in reverse order, depending on the functionality involved, as would be understood by those reasonably skilled in the art of the present disclosure. In addition, such functional elements can be implemented as logic embodied in hardware, software, firmware, or a combination thereof, among others. In some embodiments involving software implementations, such software comprises an ordered listing of executable instructions for implementing logical functions and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a computer-readable medium can be any means that can contain, store, communicate, propagate, or transport the software for use by or in connection with the instruction execution system, apparatus, or device.

It should also be emphasized that the above-described embodiments of the present disclosure are merely possible examples of implementations set forth for a clear understanding of the principles of the disclosure. Many variations and modifications may be made to the above-described embodiment(s) of the disclosure without departing substantially from the principles of the disclosure. All such modifications and variations are intended to be included herein within the scope of this disclosure. In addition, statements regarding matters that would be clear to, or recognized by, those skilled in the art or area of the present disclosure are intended to be understood within the context of having read and understood the entire present disclosure.

The invention claimed is:

1. A consolidated purchasing system for search term auctions, comprising: receiving logic receiving a plurality of orders from a plurality of customers; analyzing logic receiving and consolidating the plurality of orders, analyzing a dynamic auction for a plurality of search terms on a search engine, determining a plurality of search terms upon which to bid and an amount to bid for the plurality of search terms responsive to a budget and an expected return on the plurality of search terms; and purchasing logic receiving instructions from the bidding logic and bidding on the plurality of search terms in the dynamic auction, wherein the cost of a position on a search result list for the search engine changes responsive to the input from a plurality of auction participants, wherein the system delivers a minimum level of traffic to a customer website responsive to an order associated with a customer, the minimum level of traffic being a guaranteed minimum level of traffic.

2. The system of claim 1, wherein the analyzing logic targets multiple search terms for a single order among other plurality of orders, and aggregates a plurality of less expensive search terms to approximate an expected result from at least one more expensive search term.

3. The system of claim 1, further comprising solicitation logic soliciting orders from customers.

4. The system of claim 1, wherein the total cost achieved by the analyzing logic is lower than the cost achieved by the customers individually.

5. The system of claim 4, wherein the analyzing logic avoids bidding up a particular search term used by another customer through aggregation of a plurality of alternative search terms which yield a similar result to the particular search term.

6. The system of claim 1, wherein the purchasing logic queries the analyzing logic in response to an increase in price on a particular search term, determines whether the purchasing logic should increase its current bid on the particular search term, decreases its current bid on the particular search term, retains the current bid, or bids on alternative search terms.

7. A method for consolidated purchasing of search term auctions, the method comprising:
receiving a plurality of orders from a plurality of customers;
consolidating the plurality of orders;
determining a plurality of relevant search terms upon which to bid responsive to the orders;
analyzing a dynamic auction for the plurality of relevant search terms on a search engine;
determining an amount to bid for the plurality of search terms responsive to a budget for the plurality of orders, and an expected return on the plurality of relevant search terms;
bidding on the plurality of relevant search terms in the dynamic auction, wherein the cost of a position on a search result list for the search engine changes responsive to the input from a plurality of auction participants; and
delivering a minimum level of traffic to a customer website responsive to an order associated with a customer, wherein the minimum level of traffic is a guaranteed minimum level of traffic.

8. The method of claim 7, further comprising:
analyzing a plurality of alternative search terms included within the plurality of relevant search terms; and
aggregating a plurality of less expensive alternative search terms to approximate an expected result from at least one more expensive search term.

9. The method of claim 8, further comprising lowering the cost of the plurality of relevant search terms for the plurality of customers through consolidated purchasing and aggregating a plurality of relevant search terms.

10. The method of claim 7, further comprising soliciting orders from customers.

11. The method of claim 10, further comprising aggregating a plurality of alternative search terms which yield a similar result to a particular search term to avoid bidding up the particular search term when it is used by another customer.

12. The method of claim 7, determining whether the purchasing logic should increase its current bid on the particular search term, decrease its current bid on the particular search term, retain the current bid, or bid on alternative search terms in response to activity in the dynamic auction.

13. A computer readable medium having a program for consolidated purchasing of search term auctions, the program comprising:

receiving a plurality of orders from a plurality of customers;

consolidating the plurality of orders;

determining a plurality of relevant search terms upon which to bid responsive to the orders;

analyzing a dynamic auction for the plurality of relevant search terms on a search engine;

determining an amount to bid for the plurality of search terms responsive to a budget for the plurality of orders, and an expected return on the plurality of relevant search terms;

bidding on the plurality of relevant search terms in the dynamic auction, wherein the cost of a position on a search result list for the search engine changes responsive to the input from a plurality of auction participants; and delivering a minimum level of traffic to a customer website responsive to an order associated with a customer, wherein the minimum level of traffic is a guaranteed minimum level of traffic.

14. The computer readable medium of claim 13, wherein the program further comprises:

analyzing a plurality of alternative search terms included within the plurality of relevant search terms; and aggregating a plurality of less expensive alternative search terms to approximate an expected result from at least one more expensive search term.

15. The computer readable medium of claim 13, wherein the program further comprises lowering the cost of the plurality of relevant search terms for the plurality of customers through consolidated purchasing and aggregation of a plurality of relevant search terms.

16. The computer readable medium of claim 13, wherein the program further comprises, determining whether the purchasing logic should increase its current bid on the particular search term, decrease its current bid on the particular search term, retain the current bid, or bid on alternative search terms in response to activity in the dynamic auction.

* * * * *